United States Patent
Shveidel et al.

(10) Patent No.: US 11,507,327 B1
(45) Date of Patent: Nov. 22, 2022

(54) SYSTEM AND METHOD OF ESTIMATING PERFORMANCE HEADROOM IN A STORAGE SYSTEM

(71) Applicant: EMC IP Holding Company LLC, Hopkinton, MA (US)

(72) Inventors: Vladimir Shveidel, Pardes-Hana (IL); Amitai Alkalay, Kadima (IL); Shaul Dar, Petach Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/484,576

(22) Filed: Sep. 24, 2021

(51) Int. Cl.
  *G06F 3/06* (2006.01)
(52) U.S. Cl.
  CPC .............. *G06F 3/067* (2013.01); *G06F 3/061* (2013.01); *G06F 3/0629* (2013.01)
(58) Field of Classification Search
  CPC ................... G06F 3/067; G06F 3/061; G06F 3/0629–0634
  See application file for complete search history.

(56) References Cited

U.S. PATENT DOCUMENTS

| | | | |
|---|---|---|---|
| 10,203,887 B1 | 2/2019 | Naamad et al. | |
| 10,360,127 B1 | 7/2019 | McSweeney et al. | |
| 10,579,301 B1 | 3/2020 | Aharoni et al. | |
| 10,949,102 B2 | 3/2021 | Chen et al. | |
| 10,992,532 B1 | 4/2021 | Smith et al. | |
| 2012/0102187 A1* | 4/2012 | Bargoti ................... | G06F 3/061 709/224 |
| 2018/0032266 A1* | 2/2018 | Yan ........................ | G06F 3/0647 |
| 2022/0229761 A1* | 7/2022 | Pfitzner ................ | G06F 11/2294 |

* cited by examiner

*Primary Examiner* — Chie Yew
(74) *Attorney, Agent, or Firm* — BainwoodHuang (57) ABSTRACT

Techniques for estimating performance metrics of standalone or clustered storage systems. The techniques include receiving a request from a storage client for an estimated capacity or capability of a storage system to handle a specified workload pattern within a specified periodicity interval, in which the estimated capacity or capability of the storage system is represented by a headroom metric. The techniques further include, in response to the request from the storage client, obtaining a value of the headroom metric for the specified periodicity interval using a performance model characterized by at least a peak load reserve (PLR) metric and a long-term load reserve (LLR) metric, in which the obtained value of the headroom metric corresponds to the minimum of respective values of at least the PLR metric and the LLR metric. The techniques further include upgrading, scaling-up, and/or scaling-out the storage system based on the value of the headroom metric.

20 Claims, 2 Drawing Sheets

SYSTEM AND METHOD OF ESTIMATING PERFORMANCE HEADROOM IN A STORAGE SYSTEM

BACKGROUND

Storage systems or appliances typically include one, two, or more storage processors (also referred to herein as "storage nodes") communicably coupled to an array (also referred to herein as a "storage array") of storage units or devices such as magnetic disk drives, electronic flash drives, and/or optical drives. The storage systems or appliances are configured to service storage input/output (IO) requests issued by storage client computers (also referred to herein as "storage clients" or "clients") that specify data elements such as data blocks, data pages, and/or data files to be created on, read from, written to, or deleted from storage objects such as volumes (VOLs), logical units (LUs), and/or filesystems on the storage array. The performance of the storage systems is typically characterized by various metrics or measurements such as processor utilization, IO operations per second (IOPS), bandwidth, and/or latency.

SUMMARY

Storage system performance can be estimated based on performance models derived from linear regression techniques, among others. Such model-based estimation of storage system performance can provide estimates of performance metrics for a given configuration under certain workloads. One such performance metric is the headroom performance metric (also referred to herein as the "headroom metric"), which can provide a storage system customer with an estimated upper bound on the capacity or capability (e.g., saturation point) of a storage system to sustain an increased workload in its current configuration. If the storage system customer predicts or determines, based on the headroom metric, that the current configuration of the storage system will be insufficient to satisfy expected storage requirement needs, then proactive steps can be taken to upgrade, scale-up, and/or scale-out the storage system.

Model-based estimation of storage system performance can be problematic, however, when applied to highly complex systems such as clustered storage systems (also referred to herein as "storage clusters"). Such storage clusters can include or otherwise be associated with numerous storage nodes, storage arrays, data centers, and so on, as well as have a variety of hardware, software, and firmware components whose performance can be affected by diverse factors such as workload, capacity, fragmentation, component limits, and so on. The performance of such storage clusters can also be affected by their executing certain operations (e.g., deduplication, compression, flush, garbage collection) in the background and/or postponing execution of certain operations to later periods when at least some system resources are free (or idle). While IOPS can be increased in this way during peak periods, such postponement of operations can result in significant backlogs that must be processed within specified time intervals. Further, some postponed operations and/or background flows may be interdependent. In addition, such storage clusters may employ different logic and/or limits for certain postponed and/or background operations. Consequently, there is a need for improved model-based estimation of storage system performance that can be used to estimate performance metrics not only for standalone storage systems, but also for more complex storage systems such as storage clusters.

Techniques are disclosed herein for estimating performance metrics of a storage system. The disclosed techniques can be used to estimate performance metrics such as the headroom metric for both standalone and clustered storage systems. As employed herein, the term "headroom metric" refers to a measure of the load reserve of a storage system for handling a specified workload pattern within a specified periodicity interval. In the disclosed techniques, a value of the headroom metric can be determined as the minimum of at least two metric values, namely, a peak load reserve (PLR) metric value and a long-term load reserve (LLR) metric value. The PLR metric value is a percentage corresponding to a proportional increase in burst workload that is not to be exceeded during peak periods to avoid a reduction in storage system performance. The LLR metric value is a percentage corresponding to a proportional increase in sustained workload that is not to be exceeded during a specified periodicity interval to assure that any postponed and/or background operations can be processed within the specified periodicity interval. The disclosed techniques can include receiving a request from a storage client for an estimated capacity or capability of a storage system to handle a specified workload pattern within a specified periodicity interval, in which the estimated capacity or capability (e.g., saturation point) of the storage system is represented by the headroom metric. The disclosed techniques can further include, in response to the request from the storage client, obtaining a value of the headroom metric for the specified periodicity interval using a performance model characterized by at least a PLR metric and an LLR metric, in which the obtained value of the headroom metric corresponds to the minimum of respective values of at least the PLR metric and the LLR metric. The disclosed techniques can further include upgrading, scaling-up, and/or scaling-out the storage system based on the obtained value of the headroom metric. In this way, a storage system customer can make more accurate upgrade and/or scalability decisions whether the storage system is configured as a standalone storage system or a storage cluster.

In certain embodiments, a method of estimating performance metrics of a storage system includes receiving, from a storage client, a request for an estimated capacity or capability of a storage system to handle a specified workload pattern within a specified periodicity interval, in which the estimated capacity or capability of the storage system is represented by a headroom performance metric. The method further includes, in response to the request from the storage client, obtaining a value of the headroom performance metric for the specified periodicity interval using a performance model characterized by at least a peak load reserve (PLR) metric and a long-term load reserve (LLR) metric, in which the obtained value of the headroom performance metric corresponds to the minimum of respective values of at least the PLR metric and the LLR metric. The method further includes upgrading, scaling-up, and/or scaling-out the storage system based on the obtained value of the headroom performance metric.

In certain arrangements, the method includes obtaining the PLR metric based on a linear combination of performance characteristics of the storage system, in which the performance characteristics include a number of write operations performed per unit time, a number of read operations performed per unit time, a write bandwidth, and a read bandwidth.

In certain arrangements, the method includes monitoring a total number of storage input/output (IO) operations performed over a monitoring period, determining what number of the total number of storage IO operations are write operations, and dividing the determined number of write operations by the monitoring period to obtain the number of write operations per unit time.

In certain arrangements, the method includes monitoring a total number of storage input/output (IO) operations performed over a monitoring period, determining what number of the total number of storage IO operations are read operations, and dividing the determined number of read operations by the monitoring period to obtain the number of read operations per unit time.

In certain arrangements, the method includes monitoring a total storage input/output (TO) bandwidth achieved over a monitoring period and determining what amount of the total storage IO bandwidth corresponds to the write bandwidth.

In certain arrangements, the method includes monitoring a total storage input/output (TO) bandwidth achieved over a monitoring period and determining what amount of the total storage IO bandwidth corresponds to the read bandwidth.

In certain arrangements, the method includes normalizing each performance characteristic to a predetermined number of core processors required or assigned to perform tasks associated with the performance characteristic.

In certain arrangements, the method includes deriving a set of coefficients for the performance characteristics so that the linear combination is substantially equal to unity (1) across a plurality of different configurations of the storage system at saturation.

In certain arrangements, the method includes obtaining the LLR metric based on an integral of the PLR metric over the specified periodicity interval.

In certain arrangements, the method includes multiplying the integral of the PLR metric by a predetermined percentage value corresponding to an efficiency of a process for regulating background operations performed by the storage system.

In certain arrangements, the method includes obtaining the value of the headroom performance metric for the specified periodicity interval using the performance model characterized by the PLR metric, the LLR metric, and a hardware resource load reserve (HLR) metric, in which the obtained value of the headroom performance metric corresponds to the minimum of respective values of the PLR metric, the LLR metric, and the HLR metric.

In certain arrangements, the method includes obtaining the HLR metric based on a maximum hardware resource utilization of the storage system over the specified periodicity interval.

In certain arrangements, the method includes obtaining a plurality of values of the headroom performance metric for a plurality of specified periodicity intervals, respectively, and forecasting a performance of the storage system based on the plurality of values of the headroom performance metric.

In certain arrangements, the method includes upgrading, scaling-up, and/or scaling-out the storage system based on the forecasted performance of the storage system.

In certain embodiments, a system for estimating performance metrics of a storage system includes a memory and processing circuitry configured to execute program instructions out of the memory to receive, from a storage client, a request for an estimated capacity or capability of a storage system to handle a specified workload pattern within a specified periodicity interval, in which the estimated capacity or capability of the storage system is represented by a headroom performance metric. The processing circuitry is further configured to execute the program instructions out of the memory, in response to the request from the storage client, to obtain a value of the headroom performance metric for the specified periodicity interval using a performance model characterized by at least a peak load reserve (PLR) metric and a long-term load reserve (LLR) metric, in which the obtained value of the headroom performance metric corresponds to the minimum of respective values of at least the PLR metric and the LLR metric. The processing circuitry is further configured to execute the program instructions out of the memory to upgrade, scale-up, and/or scale-out the storage system based on the obtained value of the headroom performance metric.

In certain arrangements, the processing circuitry is further configured to execute the program instructions out of the memory to obtain the PLR metric based on a linear combination of performance characteristics of the storage system, the performance characteristics including a number of write operations performed per unit time, a number of read operations performed per unit time, a write bandwidth, and a read bandwidth, and to obtain the LLR metric based on an integral of the PLR metric over the specified periodicity interval.

In certain arrangements, the storage system is configured as a clustered storage system including a plurality of storage nodes, and the processing circuitry is further configured to execute the program instructions out of the memory to obtain the number of write operations performed per unit time by the plurality of storage nodes, the number of read operations performed per unit time by the plurality of storage nodes, the write bandwidth of the plurality of storage nodes, and the read bandwidth of the plurality of storage nodes.

In certain embodiments, a computer program product includes a set of non-transitory, computer-readable media having instructions that, when executed by processing circuitry, cause the processing circuitry to perform a method including receiving, from a storage client, a request for an estimated capacity or capability of a storage system to handle a specified workload pattern within a specified periodicity interval, in which the estimated capacity or capability of the storage system is represented by a headroom performance metric. The method further includes, in response to the request from the storage client, obtaining a value of the headroom performance metric for the specified periodicity interval using a performance model characterized by at least a peak load reserve (PLR) metric and a long-term load reserve (LLR) metric, in which the obtained value of the headroom performance metric corresponds to the minimum of respective values of at least the PLR metric and the LLR metric. The method further includes upgrading, scaling-up, and/or scaling-out the storage system based on the obtained value of the headroom performance metric.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

DETAILED DESCRIPTION

Techniques are disclosed herein for estimating performance metrics of a storage system. The disclosed techniques can be used to estimate performance metrics such as the headroom metric for both standalone and clustered storage systems. The disclosed techniques can include receiving a request from a storage client for an estimated capacity or capability of a storage system to handle a specified workload pattern within a specified periodicity interval, in which the estimated capacity or capability of the storage system is represented by the headroom metric. The disclosed techniques can further include, in response to the request from the storage client, obtaining a value of the headroom metric for the specified periodicity interval using a performance model characterized by at least a peak load reserve (PLR) metric and a long-term load reserve (LLR) metric, in which the value of the headroom metric corresponds to the minimum of respective values of at least the PLR metric and the LLR metric. The disclosed techniques can further include upgrading, scaling-up, and/or scaling-out the storage system based on the value of the headroom metric. In this way, a storage system customer can make more accurate upgrade and/or scalability decisions whether the storage system is configured as a standalone storage system or a storage cluster.

Figure 1:
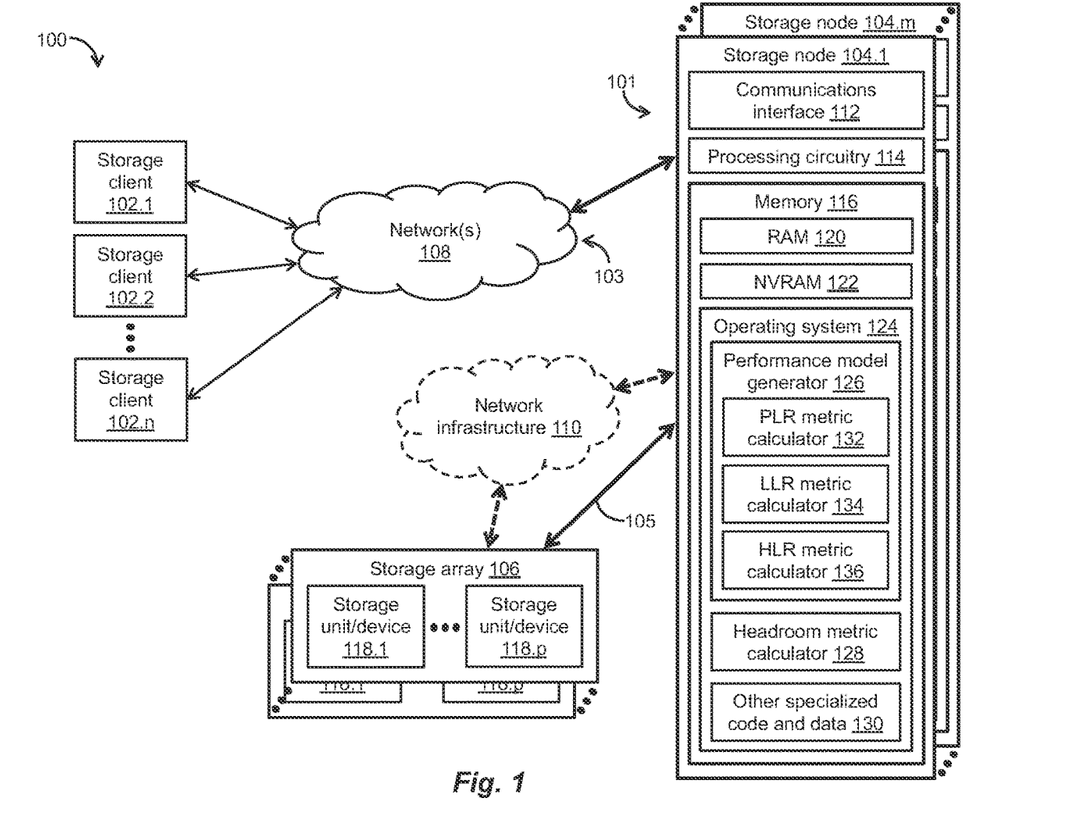
FIG. 1 is a block diagram of an exemplary storage environment, in which techniques can be practiced for estimating performance metrics of a storage system.

FIG. 1 depicts an illustrative embodiment of a storage environment 100, in which techniques can be practiced for estimating performance metrics of a storage system. As shown in FIG. 1, the storage environment 100 can include a plurality of storage client computers ("storage clients") 102.1, 102.2, ..., 102.n, a storage system 101, at least one array ("storage array") 106 of storage units or devices 118.1, ..., 118.p, and a communications medium 103 that includes at least one network 108. The plurality of storage clients 102.1, ..., 102.n can be configured to provide, over the network(s) 108, storage input/output (IO) requests (e.g., small computer system interface (SCSI) commands, network file system (NFS) commands) to the storage system 101. Such storage IO requests (e.g., read requests, write requests) can direct the storage system 101 to read and/or write data blocks, data pages, data files, and/or any other suitable data elements from/to volumes (VOLs), logical units (LUs), filesystems, and/or any other suitable storage objects on the storage array(s) 106. The storage system 101 can include one, two, or more storage processors ("storage nodes") 104.1, ..., 104.m. As such, the storage system 101 can be configured as either a standalone storage system including, for example, the storage node 104.1 or a clustered storage system ("storage cluster") including two or more of the storage nodes 104.1, ..., 104.m.

The communications medium 103 can be configured to interconnect the plurality of storage clients 102.1, ..., 102.n with one, two, or more of the storage nodes 104.1, ..., 104.m to enable them to communicate and exchange data and control signaling. As shown in FIG. 1, the communications medium 103 can be illustrated as a "cloud" to represent different network topologies such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based data communications devices and cabling, fiber optic devices and cabling, wireless devices, and so on, or any suitable combination thereof.

The storage nodes 104.1, ..., 194.m can be connected directly to the storage array(s) 106 or through a network infrastructure 110, which can include an Ethernet network, an InfiniBand network, a Fiber Channel network, and/or any other suitable network. As shown in FIG. 1, the storage node 104.1 can be configured to include a communications interface 112, processing circuitry 114, and a memory 116. It is noted that each of the storage nodes 104.1, ..., 104.m of the storage system 101 can be configured like the storage node 104.1 of FIG. 1. The communications interface 112 can include one or more of an Ethernet interface, an InfiniBand interface, a Fiber Channel interface, and/or any other suitable communications interface. The communications interface 112 can further include SCSI target adapters, network interface adapters, and/or any other suitable adapters for converting electronic, optical, and/or wireless signals received over the network(s) 108 to a form suitable for use by the processing circuitry 114.

The memory 116 can include volatile memory such as a random-access memory (RAM) 120 or any other suitable volatile memory and persistent memory such as a nonvolatile random-access memory (NVRAM) 122 or any other suitable persistent memory. The memory 116 can further include an operating system 124 such as the Linux operating system (OS), Unix OS, Windows OS, or any other suitable operating system, as well as store a variety of software constructs realized in the form of specialized code and data that can be executed by the processing circuitry 114 to carry out the techniques and/or methods disclosed herein. As shown in FIG. 1, such software constructs can include a performance model generator 126, a headroom metric calculator 128, and other specialized code and data 130 (e.g., code and data pertaining to workload process(es), postponed and/or background operations or process(es), background regulator process(es)). The performance model generator 126 can include a PLR metric calculator 132, an LLR metric calculator 134, and a hardware resource load reserve (HLR) metric calculator 136. The processing circuitry 114 can include one or more processors or controllers, multi-core processors or controllers, digital signal processors (DSPs), systems on-a-chip (SoCs), a collection of electronic circuits or circuitry, or any suitable combination thereof. The processing circuitry 114 can be configured to execute specialized code and data as program instructions out of the memory 116, process storage IO requests (e.g., read requests, write requests) issued by the storage clients 102.1, ..., 102.n, and store data and/or metadata to the storage array(s) 106 in the storage environment 100, which can be a RAID environment. As such, the storage array(s) 106 can be configured to include a coded storage target (not shown) storing coded data for use in regenerating lost or corrupted data on one or more of the storage units/devices 118.1, ..., 118.p. Further, the coded storage target can be stored to a hard disk drive (HDD) configured to store parity data in a RAID storage array. Alternatively, or in addition, the storage units/devices 118.1, ..., 118.p and the coded storage target can be stored to one or more HDDs, solid state drives (SSDs), flash devices, and/or any other suitable storage units or devices. It is noted that each of the storage nodes 104.1, ..., 104.m can include a keyboard, a mouse, and/or any other suitable IO module(s) or device(s), a user interface (UI) display, an uninterruptable power supply (UPS), and/or any other suitable modules, devices, and/or components.

In the context of the processing circuitry 114 being configured to execute specialized code and data, a computer program product can be configured to deliver all or a portion of the specialized code and data to the processing circuitry 114. Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the processing circuitry 114, the various techniques and/or methods disclosed herein.

During operation, the disclosed techniques can be used to estimate performance metrics such as the headroom metric for the storage system 101 of FIG. 1. As employed herein, the term "headroom metric" refers to a measure of the load reserve of a storage system for handling a specified workload pattern within a specified periodicity interval. In the disclosed techniques, a value of the headroom metric can be determined as the minimum of at least two metric values, namely, a peak load reserve (PLR) metric value and a long-term load reserve (LLR) metric value. The PLR metric value is a percentage corresponding to a proportional increase in burst workload that is not to be exceeded during peak periods to avoid a reduction in storage system performance. During such peak periods, the storage system may not be performing any postponed and/or background operations (e.g., deduplication, compression, flush, garbage collection). The LLR metric value is a percentage corresponding to a proportional increase in sustained workload that is not to be exceeded during a specified periodicity interval to assure that any postponed and/or background operations can be processed within the specified periodicity interval. As employed herein, the term "proportional increase" in burst or sustained workload refers to a proportional increase in all activities related to the burst or sustained workload, such as the number of read/write IOs against a storage array, the number of snapshot operations performed, and/or any other suitable burst or sustained workload activities.

In the storage environment 100 of FIG. 1, the disclosed techniques can include receiving a request from one of the storage clients 102.1, . . . , 102.n for an estimated capacity or capability (e.g., saturation point) of the storage system 101 to handle a specified workload pattern within the specified periodicity interval, in which the estimated capacity or capability of the storage system 101 is represented by the headroom metric. The disclosed techniques can further include, in response to the request from the storage client 102.1, 102.2, . . . , or 102.n, obtaining a value of the headroom metric for the specified periodicity interval using a performance model characterized by at least the PLR metric and the LLR metric, in which the value of the headroom metric corresponds to the minimum of respective values of at least the PLR metric and the LLR metric. The disclosed techniques can further include upgrading, scaling-up, and/or scaling-out the storage system 101 based on the obtained value of the headroom metric. In this way, a storage system customer can make more accurate upgrade and/or scalability decisions whether the storage system 101 is configured as a standalone storage system or a storage cluster.

The disclosed techniques for estimating performance metrics of a storage system will be further understood with reference to the following illustrative example and FIG. 1. In this example, it is assumed that a request is received at the storage system 101 from a storage client (e.g., the storage client 102.1) for an estimated capacity or capability (e.g., the saturation point) of the storage system 101 to handle a specified workload pattern within a specified periodicity interval. As employed herein, the term "workload" refers to processes that work to accomplish tasks related to client applications such as read/write IO tasks, snapshot tasks, and so on; the term "workload pattern" refers to the repeated or regular way such a workload is performed or executed; and the term "periodicity interval" refers to the regular interval at which such a workload pattern tends to recur such as every one or more days, weeks, months, and so on. The saturation point of the storage system 101 is determined with reference to the headroom metric, which is a measure of the load reserve of the storage system 101 for handling the specified workload pattern (e.g., read/write IO tasks, snapshot tasks) within the specified periodicity interval (e.g., day(s), week(s), month(s)) and is determined as the minimum of respective values of at least the peak load reserve (PLR) metric and the long-term load reserve (LLR) metric.

In this example, the PLR metric is based on a linear combination of performance characteristics of the storage system 101, namely, performance characteristics pertaining to the number of write operations performed per unit time (e.g., per second), the number of read operations performed per unit time (e.g., per second), the write bandwidth, the read bandwidth, and/or any other suitable performance characteristic(s). The performance model generator 126 (e.g., included in the storage node 104.1; see FIG. 1) monitors the total number of storage IO operations performed over a monitoring period (e.g., 1 to 20 seconds), and the PLR metric calculator 132 (e.g., included in the storage node 104.1; see FIG. 1) calculates the number of write operations performed per unit time (e.g., per second). To that end, the PLR metric calculator 132 multiplies the total number of storage IO operations performed over the monitoring period by a ratio indicating what percentage of the total number of storage IO operations are write operations and divides the result by the length of the monitoring period. The PLR metric calculator 132 also calculates the number of read operations performed per unit time (e.g., per second). To that end, the PLR metric calculator 132 multiplies the total number of storage IO operations performed over the monitoring period by a ratio indicating what percentage of the total number of storage IO operations are read operations (or 1 minus the ratio indicating what percentage of the total number of storage IO operations are write operations) and divides the result by the length of the monitoring period.

In addition, the performance model generator 126 monitors the total storage TO bandwidth achieved over the monitoring period (e.g., 1 to 20 seconds), and the PLR metric calculator 132 calculates the write bandwidth by multiplying the total storage IO bandwidth achieved over the monitoring period by the ratio indicating what percentage of the total number of storage IO operations are write operations. The PLR metric calculator 132 also calculates the read bandwidth by multiplying the total storage IO bandwidth achieved over the monitoring period by the ratio indicating what percentage of the total number of storage IO operations are read operations (or 1 minus the ratio indicating what percentage of the total number of storage IO operations are write operations).

Having calculated the performance characteristics pertaining to the number of write operations performed per unit time (e.g., per second) and the write bandwidth (referred to herein collectively as the "write performance characteristics"), the PLR metric calculator 132 normalizes each write performance characteristic to the number of core processors required or assigned to perform tasks associated with the write performance characteristic. In this example, it is assumed that the write operations are performed exclusively by two (2) core processors (or any other suitable number of core processors), and that the two (2) core processors operate at different frequencies or the operating frequency of at least one of the two (2) core processors changes over time. With these assumptions, the PLR metric calculator 132 normalizes the write performance characteristics by dividing each write performance characteristic by the product of the number of core processors (e.g., 2) and a frequency value based on the operating frequencies of the core processors performing the write operations. For example, if one of the two (2) core processors operates at 1 gigahertz (GHz) (or any other suitable frequency) over the monitoring period and the other core processor operates at 1 GHz (or any other suitable frequency) over a first half of the monitoring period and 500 megahertz (MHz) (or any other suitable frequency) over a second half of the monitoring period, then the PLR metric calculator 132 can obtain the frequency value based on the core operating frequencies, as follows:

$$(1\ GHz+(1\ GHz+500\ MHz)/2)=1.75\ GHz. \qquad (1)$$

The PLR metric calculator 132 can further obtain the product of the number of core processors (e.g., 2) and the frequency value of equation (1), as follows:

$$2*1.75\ GHz=3.50\ GHz. \qquad (2)$$

Accordingly, the write performance characteristics can be expressed, as follows:

$$IOPS_W = \frac{IOPS_{Total} * Ratio_W}{(\#core\ processors_W)*(core\ freq_W)} \text{and} \qquad (3)$$

$$BW_W = \frac{BW_{Total} * Ratio_W}{(\#core\ processors_W)*(core\ freq_W)}, \qquad (4)$$

in which "$IOPS_W$" is a percentage value corresponding to the number of write operations performed per unit time, "$IOPS_{Total}$" corresponds to the total number of storage IO operations performed over the monitoring period, "$BW_W$" is a percentage value corresponding to the write bandwidth, "$BW_{Total}$" corresponds to the total storage IO bandwidth, "$Ratio_W$" corresponds to the ratio indicating what percentage of the total number of storage IO operations are write operations, "#core processors$_W$" corresponds to the number of core processors required or assigned to perform the write operations, and "core freq$_W$" corresponds to the frequency value based on the operating frequencies (or frequency) of the core processors (or processor) performing the write operations.

Likewise, having calculated the performance characteristics pertaining to the number of read operations performed per unit time (e.g., per second) and the read bandwidth (referred to herein collectively as the "read performance characteristics"), the PLR metric calculator 132 normalizes each read performance characteristic to the number of core processors required or assigned to perform tasks associated with the read performance characteristic. In this example, it is assumed that the read operations are performed exclusively by one (1) core processor (or any other suitable number of core processors), and that the one (1) core processor operates at the same frequency, namely, 600 MHz, over the monitoring period. With these assumptions, the PLR metric calculator 132 normalizes the read performance characteristics by dividing each read performance charac-teristic by the product of the number of core processors (e.g., 1) and a frequency value based on the operating frequency (e.g., 600 MHz) of the core processor performing the read operations.

Accordingly, the read performance characteristics can be expressed, as follows:

$$IOPS_R = \frac{IOPS_{Total} * (1 - Ratio_W)}{(\#core\ processors_R)*(core\ freq_R)} \text{and} \qquad (5)$$

$$BW_R = \frac{BW_{Total} * (1 - Ratio_W)}{(\#core\ processors_R)*(core\ freq_R)}, \qquad (6)$$

in which "$IOPS_R$" is a percentage value corresponding to the number of read operations performed per unit time, "$IOPS_{Total}$" corresponds to the total number of storage IO operations performed over the monitoring period, "$BW_R$" is a percentage value corresponding to the read bandwidth, "$BW_{Total}$" corresponds to the total storage IO bandwidth, "$Ratio_W$" corresponds to the ratio indicating what percentage of the total number of storage IO operations are write operations, "#core processors$_R$" corresponds to the number of core processors required or assigned to perform the read operations, and "core freq$_R$" corresponds to the frequency value based on the operating frequency (or frequencies) of the core processor (or processors) performing the read operations.

As described herein, the PLR metric is based on a linear combination of performance characteristics pertaining to the number of write operations performed per unit time ($IOPS_W$; see equation (3)), the number of read operations performed per unit time ($IOPS_R$; see equation (5)), the write bandwidth ($BW_W$; see equation (4)), and the read bandwidth ($BW_R$; see equation (6)), and/or any other suitable performance characteristics. In this example, the PLR metric calculator 132 calculates the linear combination of performance characteristics using a predefined set of coefficients $C_1$, $C_2$, $C_3$, $C_4$ to obtain a combined performance metric (also referred to herein as the "combined metric"), as follows:

$$combined\_metric = C_1 * IOPS_W + C_2 * BW_W + C_3 * IOPS_R + C_4 * BW_R. \qquad (7)$$

It is noted that the values of the coefficients $C_1$, $C_2$, $C_3$, $C_4$ (see equation (7)) can be calculated in advance using linear regression techniques, among others. To that end, several storage nodes (e.g., the storage nodes 104.1, ..., 104.m; see FIG. 1) or storage appliances with different configurations can be saturated with storage IO commands, and a set of data pertaining to the various performance characteristics (e.g., $IOPS_W$, $IOPS_R$, $BW_W$, $BW_R$) can be calculated, obtained, or otherwise determined on each storage node or appliance. Linear regression techniques can then be performed on the entire data set to derive the coefficients $C_1$, $C_2$, $C_3$, $C_4$ that come closest to generating a combined metric value equal to about "1.0" across all the different configurations at saturation. In this example, the resulting combined metric value can provide an indication of how far the storage system 101 is from its saturation point. Further details pertaining to the combined metric can be found in U.S. patent application Ser. No. 17/198,551 filed Mar. 11, 2021, entitled ADAPTIVE TURBO TOGGLING.

Having obtained the combined metric (see equation (7)), the PLR metric calculator 132 calculates the PLR metric value ("PLR"), as follows:

$$PLR = 100\% - (combined\_metric), \qquad (8)$$

in which "combined_metric" is determined as in equation (7). The PLR metric calculator 132 also stores the PLR metric value in the RAM 120 (e.g., included in the storage node 104.1; see FIG. 1).

In this example, the LLR metric calculator 134 (e.g., included in the storage node 104.1; see FIG. 1) calculates the LLR metric value ("LLR"), as follows:

$$LLR = k * \int PLR, \tag{9}$$

in which "k" is a predetermined percentage value corresponding to the efficiency of a background regulator process executed by the storage system 101, and "∫PLR" corresponds to an integral of the PLR metric over the specified periodicity interval. In this example, the storage system 101 executes the background regulator process to reduce the impact that any operations performed in the background may have on client IO performance, while assuring that it operates within its internal limits. The LLR metric calculator 134 also stores the LLR metric value in the RAM 120.

As described herein with reference to equations (7) and (8), the PLR metric calculator 132 calculates the PLR metric value based on a combined performance metric, which, in this example, is a percentage value obtained from the linear combination of several performance characteristics of the storage system 101 (see equation (7)). The combined metric provides an indication of how close the storage system 101 is to its saturation point, as well as an indication of the amount of free (or idle) processing cycles and/or resources of the storage system 101 might be available to perform background operations within the specified periodicity interval. In an ideal storage system, it may be possible to use up to all free processing cycles and/or resources to perform such background operations. However, this typically may not be the case in a practical storage system. For example, a calculation of the integral of the PLR metric (e.g., ∫PLR; see equation (9)) over the specified periodicity interval may indicate that up to a 40% increase in activity is available for performing background operations. In the practical storage system, however, less than a 40% increase in activity may be available due to the efficiency of the background regulator process, which may be substantially less than 100%. For this reason, the LLR metric value is expressed in equation (9) as the product of the predetermined efficiency percentage, k, and the integral, ∫PLR. In this example, the predetermined efficiency percentage, k, can be calculated, as follows:

$$k = 1.00 - \frac{\int PLR_{max\_workload}}{100\%}, \tag{10}$$

in which "∫PLR$_{max\_workload}$" corresponds to an integral of the PLR metric over the specified periodicity interval under the maximum workload of the storage system 101 (e.g., at saturation). It is noted that a high efficiency background regulator process would have an efficiency percentage, k, approaching 100% (or 1.00).

In this example, the headroom metric calculator 128 (e.g., included in the storage node 104.1; see FIG. 1) obtains the headroom metric of the storage system 101 using a performance model characterized by the PLR metric and the LLR metric. As such, the headroom metric calculator 128 calculates the headroom metric as the minimum of the PLR metric value (as determined with respect to equation (8)) and the LLR metric value (as determined with respect to equation (9)). It is noted that a headroom metric of the storage system 101 can be obtained once every specified periodicity interval.

Alternatively, the headroom metric calculator 128 can obtain the headroom metric of the storage system 101 using a performance model characterized by a hardware resource load reserve (HLR) metric in addition to the PLR metric and the LLR metric. Further, the headroom metric calculator 128 can calculate the headroom metric as the minimum of respective values of the PLR metric, the LLR metric, and the HLR metric. In this example, the HLR metric calculator 136 (e.g., included in the storage node 104.1; see FIG. 1) can calculate an HLR metric value ("HLR") for a respective hardware resource, as follows:

$$HLR = 100\% - (HW\_resource\_utilization_{max}), \tag{11}$$

in which "HW_resource_utilization$_{max}$" corresponds to the maximum utilization of the respective hardware resource over the specified periodicity interval. The HLR metric calculator 136 can also store such HLR metric values in the RAM 120. In this example, the hardware resource utilization corresponds to a percentage value proportional to the IO bandwidth of a respective hardware resource of the storage system 101 such as the IO bandwidth of the NVRAM 122, the IO bandwidth of the storage unit(s)/device(s) 118.1, . . . , and/or 118.p, the IO bandwidth of SCSI, Ethernet, InfiniBand, or Fiber Channel interface, and so on. It is noted that such HLR metric values are typically proportional to the workload so that if the workload increases by a certain percentage amount, then the HLR metric values increase by about the same percentage amount. It is further noted that, in this example, such HLR metric values may be omitted from the calculation of the headroom metric because the storage system 101 is typically limited primarily by its hardware processing resources, which are already at least partially accounted for in the calculations of the PLR and LLR metric values.

Having obtained the headroom metric of the storage system 101 for the specified periodicity interval, a storage system customer can make upgrade and/or scalability decisions with increased accuracy whether the storage system 101 is configured as a standalone storage system or a storage cluster. For example, if the calculated headroom metric value is 40% (or any other suitable percentage), then the storage system customer can expect the storage system 101 to provide reduced performance if the specified workload pattern (e.g., read/write IO tasks, snapshot tasks) for the specified periodicity interval (e.g., one or more days, weeks, months) increases proportionally by 40% or more. Further, by calculating a headroom metric value for the storage system 101 once every specified periodicity interval (e.g., once every one or more days, weeks, months), the storage system customer can obtain a series of headroom metric values for use in performance forecasting. For example, if a headroom metric value is calculated once every week for five (5) consecutive weeks, resulting in series of headroom metric values 40%, 35%, 30%, 25%, and 20%, then the storage system customer can forecast that the storage system 101 will provide reduced performance within several weeks. To avoid such reduced performance, the storage system customer can take proactive steps to upgrade the storage system 101 (e.g., by replacing it with a model that provides increased performance), scale-up the storage system 101 (e.g., by increasing its processing, network, and/or storage resources), and/or scale-out the storage system 101 (e.g., by increasing the number of storage clusters from N storage cluster(s) to N+1 storage clusters, in which "N" is a positive integer). Alternatively, or in addition, the storage system customer may identify and terminate certain storage applications and/or storage objects that are consuming inordinate amounts of resources.

Figure 2:
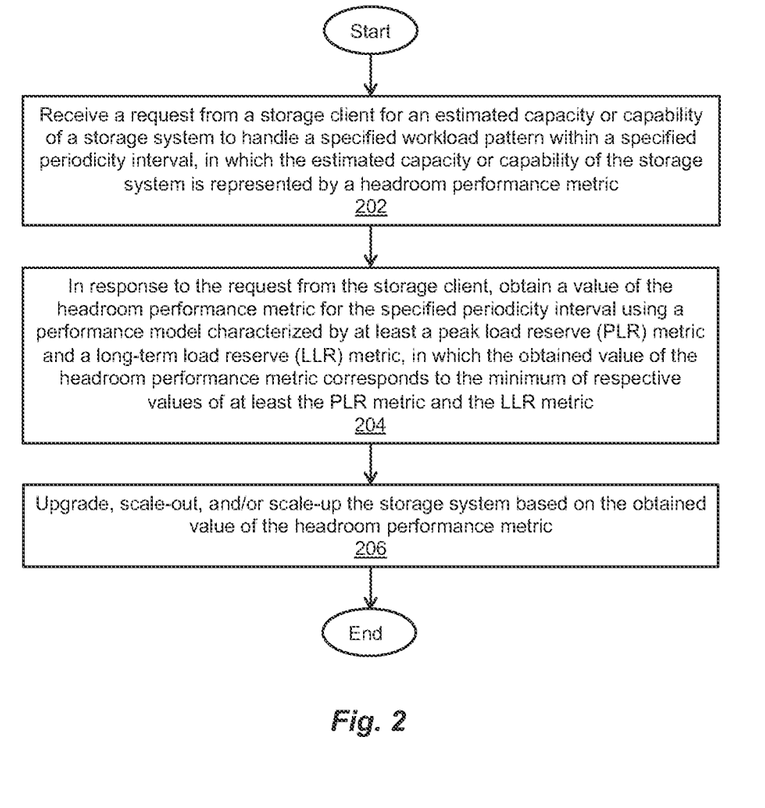
FIG. 2 is a flow diagram of an exemplary method of estimating performance metrics of a storage system.

An exemplary method of estimating performance metrics of a storage system is described below with reference to FIG. 2. As depicted in block 202, a request is received from a storage client for an estimated capacity or capability of a storage system to handle a specified workload pattern within a specified periodicity interval, in which the estimated capacity or capability of the storage system is represented by a headroom performance metric. As depicted in block 204, in response to the request from the storage client, a value of the headroom performance metric is obtained for the specified periodicity interval using a performance model characterized by at least a peak load reserve (PLR) metric and a long-term load reserve (LLR) metric, in which the obtained value of the headroom performance metric corresponds to the minimum of respective values of at least the PLR metric and the LLR metric. As depicted in block 206, the storage system is upgraded, scaled-up, or scaled-out based on the obtained value of the headroom performance metric.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit or device may be a physical entity such as a drive or disk or an array of drives or disks for storing data in storage locations that can be accessed by addresses. A physical storage unit or device may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of estimating performance metrics of a storage system, comprising:

receiving, from a storage client, a request for an estimated capacity or capability of a storage system to handle a specified workload pattern within a specified periodicity interval, the estimated capacity or capability of the storage system being represented by a headroom performance metric;

in response to the request from the storage client, obtaining a value of the headroom performance metric for the specified periodicity interval using a performance model characterized by at least a peak load reserve (PLR) metric and a long-term load reserve (LLR) metric, the obtained value of the headroom performance metric corresponding to minimum of respective values of at least the PLR metric and the LLR metric; and upgrading, scaling-up, and/or scaling-out the storage system based on the obtained value of the headroom performance metric.

2. The method of claim 1 further comprising:

obtaining the PLR metric based on a linear combination of performance characteristics of the storage system, the performance characteristics including a number of write operations performed per unit time, a number of read operations performed per unit time, a write bandwidth, and a read bandwidth.

3. The method of claim 2 further comprising:

monitoring a total number of storage input/output (TO) operations performed over a monitoring period;

determining what number of the total number of storage IO operations are write operations; and dividing the determined number of write operations by the monitoring period to obtain the number of write operations per unit time.

4. The method of claim 2 further comprising:

monitoring a total number of storage input/output (TO) operations performed over a monitoring period;

determining what number of the total number of storage IO operations are read operations; and dividing the determined number of read operations by the monitoring period to obtain the number of read operations per unit time.

5. The method of claim 2 further comprising:

monitoring a total storage input/output (TO) bandwidth achieved over a monitoring period; and determining what amount of the total storage IO bandwidth corresponds to the write bandwidth.

6. The method of claim 2 further comprising:

monitoring a total storage input/output (TO) bandwidth achieved over a monitoring period; and determining what amount of the total storage IO bandwidth corresponds to the read bandwidth.

7. The method of claim 2 further comprising:

normalizing each performance characteristic to a predetermined number of core processors required or assigned to perform tasks associated with the performance characteristic.

8. The method of claim 2 further comprising:

deriving a set of coefficients for the performance characteristics so that the linear combination is equal to unity (1) across a plurality of different configurations of the storage system at saturation.

9. The method of claim 2 further comprising:

obtaining the LLR metric based on an integral of the PLR metric over the specified periodicity interval.

10. The method of claim 9 wherein the obtaining of the LLR metric includes multiplying the integral of the PLR metric by a predetermined percentage value corresponding to an efficiency of a process that regulates background operations performed by the storage system.

11. The method of claim 1 wherein the obtaining of the value of the headroom performance metric for the specified periodicity interval includes using the performance model characterized by the PLR metric, the LLR metric, and a hardware resource load reserve (HLR) metric, the obtained value of the headroom performance metric corresponding to minimum of respective values of the PLR metric, the LLR metric, and the HLR metric.

12. The method of claim 11 further comprising:

obtaining the HLR metric based on a maximum hardware resource utilization of the storage system over the specified periodicity interval.

13. The method of claim 1 further comprising:

obtaining a plurality of values of the headroom performance metric for a plurality of specified periodicity intervals, respectively; and forecasting a performance of the storage system based on the plurality of values of the headroom performance metric.

14. The method of claim 13 wherein the upgrading, scaling-up, and/or scaling-out of the storage system is based on the forecasted performance of the storage system.

15. A system for estimating performance metrics of a storage system, comprising:

a memory; and processing circuitry configured to execute program instructions out of the memory to:

receive, from a storage client, a request for an estimated capacity or capability of a storage system to handle a specified workload pattern within a specified periodicity interval, the estimated capacity or capability of the storage system being represented by a headroom performance metric;

in response to the request from the storage client, obtain a value of the headroom performance metric for the specified periodicity interval using a performance model characterized by at least a peak load reserve (PLR) metric and a long-term load reserve (LLR) metric, the obtained value of the headroom performance metric corresponding to minimum of respective values of at least the PLR metric and the LLR metric; and upgrade, scale-up, and/or scale-out the storage system based on the obtained value of the headroom performance metric.

16. The system of claim 15 wherein the processing circuitry is further configured to execute the program instructions out of the memory to obtain the PLR metric based on a linear combination of performance characteristics of the storage system, the performance characteristics including a number of write operations performed per unit time, a number of read operations performed per unit time, a write bandwidth, and a read bandwidth, and to obtain the LLR metric based on an integral of the PLR metric over the specified periodicity interval.

17. The system of claim 16 wherein the storage system is configured as a clustered storage system including a plurality of storage nodes, and wherein the processing circuitry is further configured to execute the program instructions out of the memory to obtain the number of write operations performed per unit time by the plurality of storage nodes, the number of read operations performed per unit time by the plurality of storage nodes, the write bandwidth of the plurality of storage nodes, and the read bandwidth of the plurality of storage nodes.

18. The system of claim 15 wherein the processing circuitry is further configured to execute the program instructions out of the memory to obtain the value of the headroom performance metric for the specified periodicity interval using the performance model characterized by the PLR metric, the LLR metric, and a hardware resource load reserve (HLR) metric, the obtained value of the headroom performance metric corresponding to minimum of respective values of the PLR metric, the LLR metric, and the HLR metric.

19. The system of claim 15 wherein the processing circuitry is further configured to execute the program instructions out of the memory to obtain a plurality of values of the headroom performance metric for a plurality of specified periodicity intervals, respectively, and to forecast a performance of the storage system based on the plurality of values of the headroom performance metric.

20. A computer program product including a set of non-transitory, computer-readable media having instructions that, when executed by processing circuitry, cause the processing circuitry to perform a method comprising:

receiving, from a storage client, a request for an estimated capacity or capability of a storage system to handle a specified workload pattern within a specified periodicity interval, the estimated capacity or capability of the storage system being represented by a headroom performance metric;

in response to the request from the storage client, obtaining a value of the headroom performance metric for the specified periodicity interval using a performance model characterized by at least a peak load reserve (PLR) metric and a long-term load reserve (LLR) metric, the obtained value of the headroom performance metric corresponding to minimum of respective values of at least the PLR metric and the LLR metric; and upgrading, scaling-up, and/or scaling-out the storage system based on the obtained value of the headroom performance metric.

* * * * *